United States Patent
Yoshida

(10) Patent No.: US 8,954,468 B2
(45) Date of Patent: Feb. 10, 2015

(54) EXTRACTING A MEANINGFUL FREQUENT ITEMSET

(75) Inventor: Issei Yoshida, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 13/253,102

(22) Filed: Oct. 5, 2011

(65) Prior Publication Data

US 2012/0096031 A1    Apr. 19, 2012

(30) Foreign Application Priority Data

Oct. 14, 2010 (JP) .................................. 2010-231622

(51) Int. Cl.
*G06F 17/30* (2006.01)

(52) U.S. Cl.
CPC ............................. *G06F 17/30539* (2013.01)
USPC .......................................................... 707/776

(58) Field of Classification Search
None
See application file for complete search history.

(56) References Cited

U.S. PATENT DOCUMENTS

| | | | |
|---|---|---|---|
| 5,615,341 A * | 3/1997 | Agrawal et al. | 705/7.29 |
| 6,094,645 A * | 7/2000 | Aggarwal et al. | 706/47 |
| 6,138,117 A | 10/2000 | Bayardo | |
| 6,473,757 B1 * | 10/2002 | Garofalakis et al. | 1/1 |
| 7,020,587 B1 | 3/2006 | Di et al. | |
| 7,379,937 B2 * | 5/2008 | Inokuchi | 1/1 |
| 7,433,879 B1 * | 10/2008 | Sharma et al. | 1/1 |
| 2001/0027447 A1 | 10/2001 | Matsuura | |
| 2003/0236785 A1 * | 12/2003 | Shintani et al. | 707/6 |
| 2005/0044073 A1 * | 2/2005 | Inokuchi | 707/3 |
| 2007/0033185 A1 * | 2/2007 | Maag | 707/6 |
| 2008/0127043 A1 * | 5/2008 | Zhou et al. | 717/104 |
| 2010/0010985 A1 * | 1/2010 | Wong et al. | 707/5 |

FOREIGN PATENT DOCUMENTS

| | | |
|---|---|---|
| CN | 101311928 A | 11/2008 |
| CN | 101499066 A | 8/2009 |

(Continued)

OTHER PUBLICATIONS

M. Boley et al., "Efficient Discovery of Interesting Patterns Based on Strong Closedness," Statistical Analysis and Data Mining. vol. 2, Issue 5&ash,6. pp. 346-360, Dec. 2009.

J. Cheng et al., "Sigma-tolerance closed frequent itemsets," ICDM, Proceedings of the Sixth International Conference on Data Mining, pp. 139–.148, 2006.

(Continued)

*Primary Examiner* — Tony Mahmoudi
*Assistant Examiner* — Michael Le
(74) *Attorney, Agent, or Firm* — Edward J. Wixted, III; Vasken A. Alexanian

(57) ABSTRACT

An efficient extraction of a meaningful frequent itemsets. The present invention discloses a system that includes a decision unit that decides a new itemset that becomes an investigation target in the same sequence as searching an itemset tree in a depth-first manner and in descending order. The present invention further discloses a frequent occurrence determining unit that registers the frequency of occurrence of the new itemset in a table if the frequency of occurrence is equal to or more than a predetermined threshold. The present invention includes a correlation determining unit that determines whether there is a correlation between each item in the new itemset and a subset of remaining items that were removed from the new itemset. The present invention discloses a registration unit that registers the new itemset in a set of meaningful frequent itemsets if the determination is positive for all items of the new itemset.

12 Claims, 10 Drawing Sheets

(56) References Cited

FOREIGN PATENT DOCUMENTS

| | | |
|---|---|---|
| CN | 101593200 A | 12/2009 |
| JP | 8-287106 | 11/1986 |
| JP | 2001-229268 A | 8/2001 |
| JP | 2003-076937 A | 3/2003 |
| JP | 2004-062898 A | 2/2004 |
| JP | 2005-285048 A | 10/2005 |
| JP | 2007-018349 A | 1/2007 |

OTHER PUBLICATIONS

Y. Ke et al., "Mining quantitative correlated patterns using an information-theoretic approach," Proceedings of the 12th ACM SIGKDD International conference on knowledge discovery and data mining, pp. 227–236, Aug. 2006.

X. Zhang et al., "Mining Non-Redundant High Order Correlations in Binary Data." Proceedings of the VLDB Endowment, vol. 1, Issue 1, pp. 1178-1188, Aug. 2008.

\* cited by examiner

| RECORD | ITEMSET |
|---|---|
| $t_1$ | $x_1$ $x_2$ $x_3$ $x_4$ |
| $t_2$ | $x_1$ $x_3$ $x_4$ |
| $t_3$ | $x_1$ $x_2$ $x_3$ |
| $t_4$ | $x_3$ $x_4$ |

(b)

| ITEM | RECORDSET |
|---|---|
| $x_1$ | $t_1$ $t_2$ $t_3$ |
| $x_2$ | $t_1$ $t_3$ |
| $x_3$ | $t_1$ $t_2$ $t_3$ $t_4$ |
| $x_4$ | $t_1$ $t_2$ $t_4$ |

FIG. 5
(a)
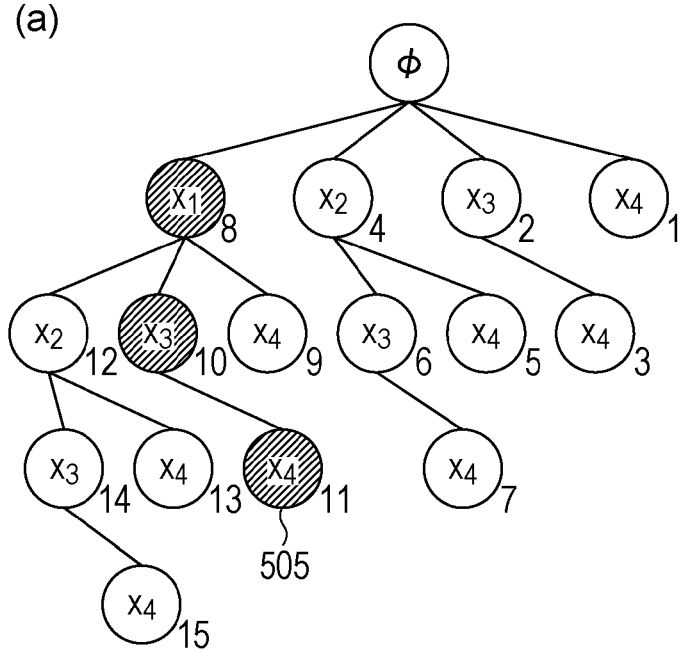
(b)
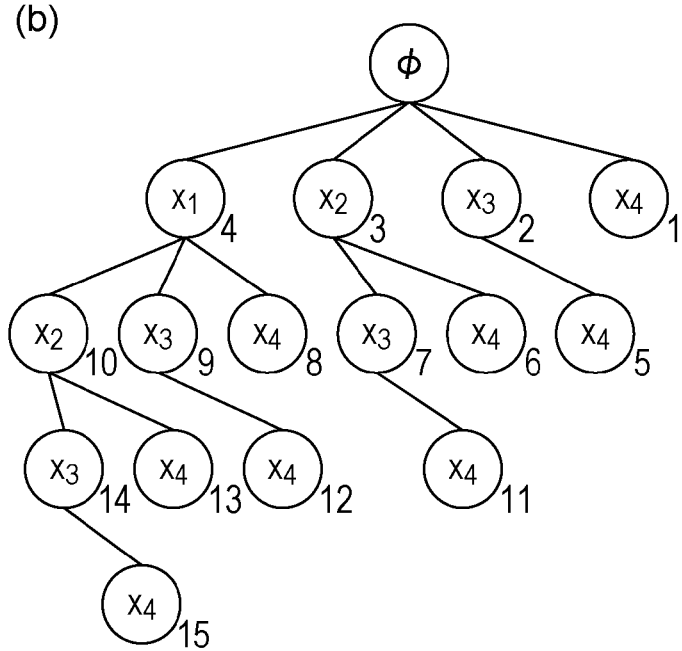

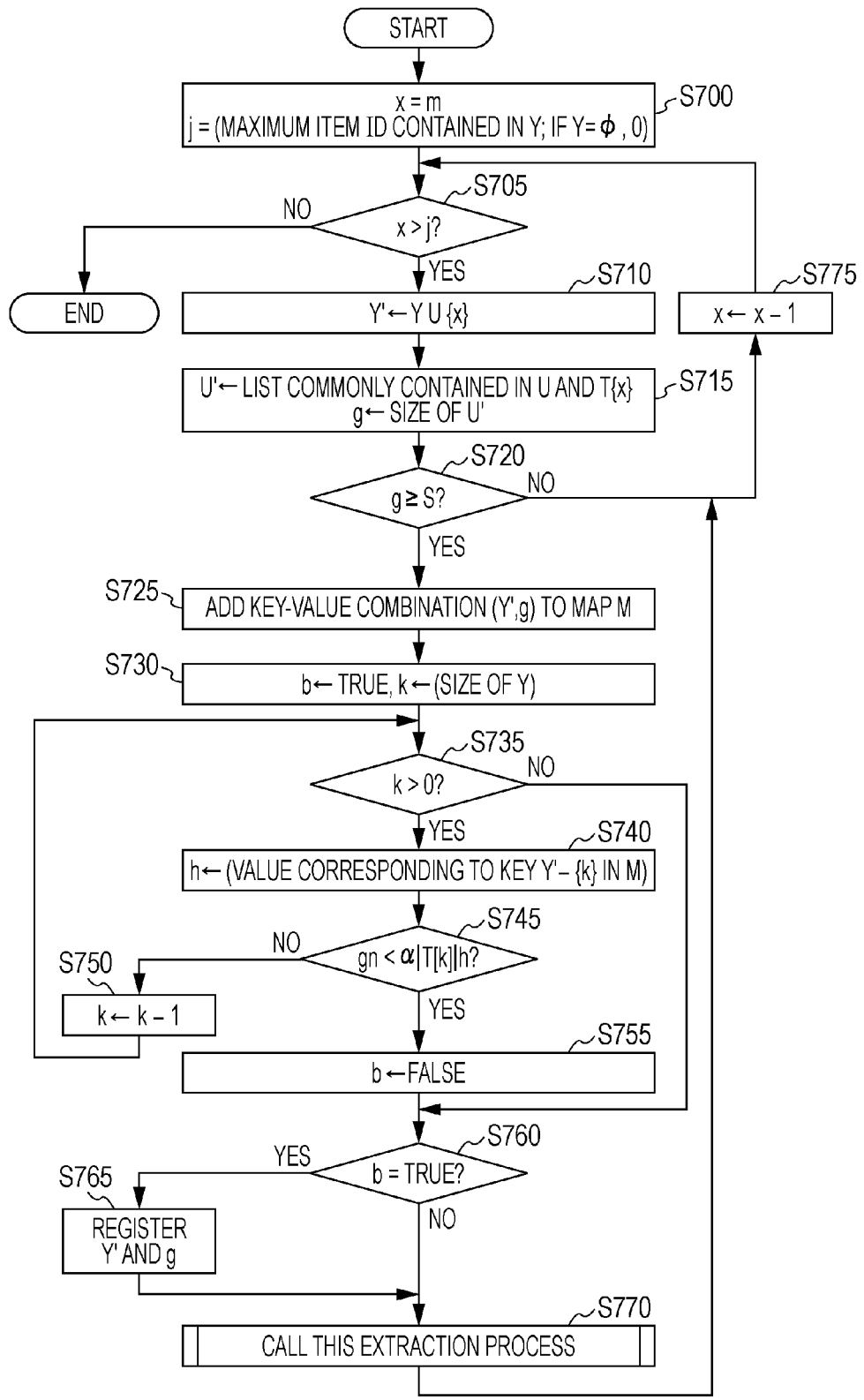

FIG. 8

```
Mine(X,T,α,S,O,Y,T(Y))
   for each z∈X, a child of Y in itemset tree in descending order of items
      Y':=Y U {z}
      if |T(Y')|≥S // |T(Y')|=|T(Y U {z})| is calculated here using T(Y) and T({z})
         register (Y', |T(Y')|) into M
         flag = true // a local variable
         for each y in Y in descending order of items
            get |T(Y'-{y})| from M // existence guaranteed
            if |T(Y')||T| < α|T(Y'-{y})||T({y})|
               flag = false and break the inner for loop
            end if
         end for
         if flag = true then O:=O U {Y'}
         end if
         Mine(X,T,α,S,O,Y',T(Y')) // process recursively
      end if
   end for
```

EXTRACTING A MEANINGFUL FREQUENT ITEMSET

CROSS-REFERENCE TO RELATED APPLICATION

This application claims priority under 35 U.S.C. §119 from Japanese Patent Application No. 2010-231622 filed Oct. 14, 2010, the entire contents of which are incorporated herein by reference.

BACKGROUND OF THE INVENTION

1. Field of the Invention

The present invention relates to a technique for extracting only meaningful frequent itemsets from a database in which a plurality of records each containing an itemset consisting of one or more items is stored. In particular, it relates to a technique for efficiently extracting such itemsets with a reasonable number of frequency calculations and with a reasonable amount of memory usage.

2. Description of Related Art

Various kinds of data mining of extracting useful knowledge from an enormous amount of accumulated data have been studied. Among them, a technique for detecting a group of items (e.g., products) that frequently occur in a target plurality of records (e.g., history of issued receipts) is called frequent pattern mining, and many methods of that technique have been proposed. Frequent pattern mining defines an itemset that satisfies "frequency of an itemset predetermined threshold (called "minimum support")" as a frequent itemset and extracts a set of frequent itemsets.

However, a high frequency of occurrence of an itemset does not always mean a strong relationship between the items. For example, in the case of an itemset consisting of highly frequent items, even if the items are not related to each other, it is highly likely that that itemset frequently occurs. When the items are not related to each other, that frequent itemset is a meaningless itemset. In the meantime, it has been known that, for a practical minimum support value, which is provided by a user, an enormous number of frequent itemsets are typically generated.

There exists a traditional technique for introducing an idea of a closed frequent set, defining this, and extracting a closed frequent itemset that satisfies that definition (see M. Boley et al., "Efficient Discovery of Interesting Patterns Based on Strong Closedness," Statistical Analysis and Data Mining, Volume 2, Issue 5&ash;6, Pages 346-360, December 2009). Here, an itemset Y is closed frequent if the condition that "Y frequently occurs and, for any $Y \subset Y'$ and $Y \neq Y'$, frequency of Y>frequency of Y'" is satisfied. There also exists a traditional technique in which the above definition of a closed frequent set is extended such that an itemset that satisfies the condition that for a given threshold value $\delta > 0$, "Y frequently occurs and, for any $Y \subset Y'$ and $Y \neq Y'$, (frequency of $Y \times \delta$)>frequency of Y'" is extracted (see J. Cheng et al., "Sigma-tolerance closed frequent itemsets," ICDM, Proceedings of the Sixth International Conference on Data Mining, pages 139–148, 2006).

When a closed frequent itemset is extracted, a subset of an itemset that has the same frequency of occurrence as that of the whole itemset is not uselessly extracted as a frequent itemset. For example, a case is discussed where in POS data of a supermarket, an itemset $Y_1 = \{\text{toothpaste, bread}\}$ occurs 500 times and an itemset $Y_2 = \{\text{toothpaste, bread, beer}\}$ also occurs 500 times. In this case, only the itemset $Y_2$ is extracted as a closed frequent itemset. However, for the closed frequent itemset, its items are not considered to be highly related to each other. Thus, even with an idea of a closed frequent itemset, a meaningful frequent itemset cannot be extracted.

To address this, a technique for extracting an itemset whose items are highly related to each other is necessary. Such traditional techniques are described in Y. Ke et al., "Mining quantitative correlated patterns using an information-theoretic approach," Proceedings of the 12th ACM SIGKDD international conference on knowledge discovery and data mining, pages 227–236, August 2006 and X. Zhang et al., "Mining Non-Redundant High Order Correlations in Binary Data," Proceedings of the VLDB Endowment, Volume 1, Issue 1, pages 1178-1188, August 2008. The techniques described in Ke et al. and Zhang et al. aim to extract an itemset having three or more correlated items by an approach based on mutual information and entropy.

However, the techniques proposed in Ke et al. and Zhang et al. are based on pairwise comparison. Thus each of these techniques ensures merely a high correlation between any two items in an extracted itemset.

For example, a case where the above-described technique is applied to a call log in a call center and an itemset {operating system A, browser B, abnormal termination} was extracted is discussed. In this case, high correlations between {operating system A, browser B}, between {browser B, abnormal termination}, and between {operating system A, abnormal termination} are ensured. However, the condition that "an abnormal termination occurred in not other operating systems but the operating system A when not other browsers but the browser B is used" is not ensured. Japanese Unexamined Patent Application Publication No. 8-287106 discloses a correlation rule extraction technique.

SUMMARY OF THE INVENTION

Accordingly, an object of the present invention is to provide a technique for enabling extraction of only meaningful frequent itemsets. To this end, it is necessary to define a relationship between items in an itemset to be extracted. Such a definition requires detailed information and increases computational complexity. Therefore, a further object of the present invention is to provide a calculation technique of, in extraction of a meaningful frequent itemset according to such new definition, enabling efficient discovery of such an itemset with a reasonable number of frequency calculations and with a reasonable amount of memory usage and without the need for an excessive number of frequency calculations and excessive memory.

To attain the above objects, the idea of an innercorrelation frequent set is defined as follows: An itemset Y is innercorrelated frequent if "the itemset Y frequently occurs and, for any item y in the itemset Y, a subset $Y - \{y\}$ of remaining items exclusive of y and the item y are correlated to each other."

When an innercorrelated frequent itemset is extracted according to the above definition, an itemset consisting of a set of items that truly tend to co-occur can be listed because it is determined whether each item y in the itemset Y occurs in cooperation with the occurrence of a subset of remaining items exclusive of that item y. Thus extraction of an innercorrelated frequent itemset enables extraction of only a meaningful frequent itemset.

The present invention of extracting an innercorrelated frequent set can be achieved by a method for extracting a meaningful frequent itemset from a database in which a plurality of records each containing an itemset consisting of one or more items is stored by processing of a computer, as described below. The plurality of items in the database has an order in which the items are arranged. This order in which the items are arranged can be any order. For example, if each item is identified by a positive integer ID, the order can be determined by the IDs. Alternatively, it can be an order in which frequencies of occurrence of the items are arranged.

In one aspect of the present invention, a method is disclosed. The method includes the steps of: (a) deciding, based on the condition that there exist one or more items after the last item in the order in an old itemset that is an immediately preceding investigation target, a new itemset that is a new investigation target by adding one of the one or more items after the last item to the old itemset in descending order, wherein the old itemset has an initial value of an empty item $\phi$ being the first item in the order; (b) registering a frequency of occurrence of the new itemset in a table prepared on a memory of the computer on the condition that the frequency of occurrence of the new itemset is equal to or more than a predetermined threshold; (c) determininguing a value in the table, whether there is a correlation between each item in the new itemset and a subset of remaining items in which that item is removed from the new itemset; (d) registering the new itemset in a set of the meaningful frequent itemsets on the condition that the determination is positive for each of all the items in the new itemset; and (e) setting the new itemset to the old itemset and repeating the step (a) before deciding a new itemset on the basis of the original old itemset.

In another aspect of the present invention, the method described above can be carried out through a computer readable medium. The computer readable storage medium is tangibly embodying a computer readable program code having computer readable instructions which, when implemented, cause a computer to carry out a method for extracting a meaningful frequent itemset from a database in which a plurality of records each containing an itemset consisting of one or more items is stored by processing of a computer, the plurality of items in the database having an order in which the items are arranged.

In yet another aspect of the present invention, a system is disclosed. The system for extracting a meaningful frequent itemset from a database in which a plurality of records each containing an itemset consisting of one or more items is stored, the plurality of items in the database having an order in which the items are arranged, the system includes a memory, a decision unit that, if there exist one or more items after the last item in the order in an old itemset that is an immediately preceding investigation target, decides a new itemset that is a new investigation target itemset by adding one of the one or more items after the last item to the old itemset in descending order, where the old itemset has an initial value of an empty item $\phi$ being the first item in the order, a frequent occurrence determining unit that determines whether a frequency of occurrence of the new itemset is equal to or more than a predetermined threshold and, on condition that it is equal to or more than the predetermined frequency of occurrence, registers the frequency of occurrence of the new itemset in a table prepared on the memory, a correlation determining unit that, in response to the registration in the table, determines, using a value in the table, whether there is a correlation between each item in the new itemset and a subset of remaining items in which that item is removed from the new itemset and a registration unit that registers the new itemset in a set of the meaningful frequent itemsets on condition that the determination is positive for each of all the items in the new itemset, where, in response to the registration in the set of the meaningful frequent itemsets, the decision unit sets the new itemset to the old itemset and decides a new itemset earlier for that old itemset.

With the present invention, an itemset that is a frequent itemset and that has a correlation between any item in the itemset and a subset of all the remaining items exclusive of that item is extracted. Therefore, only an itemset consisting of a set of items that truly tend to co-occur can be extracted, and a meaningful frequent itemset can be extracted. In obtaining such an itemset, the frequency of occurrence calculated for an itemset whose items are one less in number is reused. Accordingly, a meaningful frequent itemset can be efficiently extracted without the need for an excessive number of frequency calculations and excessive memory. Other advantageous effects of the present invention are understood from the description of embodiments.

BRIEF DESCRIPTION OF THE DRAWINGS

FIG. 2(*a*) illustrates an outline of a data structure of a database device 110, and FIG. 2(*b*) illustrates a look-up table.

FIG. 5(*a*) illustrates a scanning sequence when the tree illustrated in FIG. 4 is scanned in a depth-first manner and in descending order, and FIG. 5(*b*) illustrates a scanning sequence when the tree illustrated in FIG. 4 is scanned in a breadth-first manner and in descending order.

FIG. 7 illustrates an example flow of an extraction process at step 615 illustrated in FIG. 6.

FIG. 8 illustrates example pseudocode of a recursive function Mine for performing a process of extracting an innercorrelation frequent itemset.

DETAILED DESCRIPTION OF THE PREFERRED EMBODIMENTS

Figure 1:
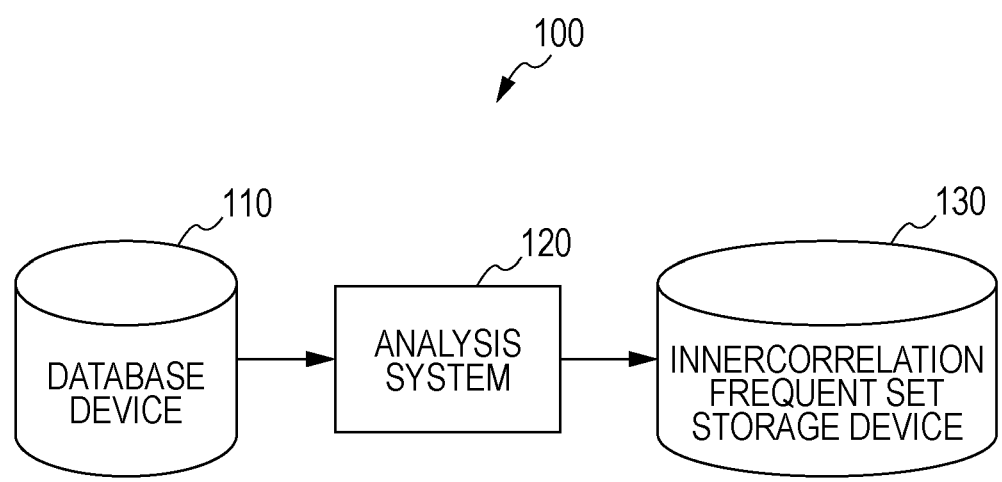
FIG. 1 illustrates a general configuration of an information system 100.

Best mode for carrying out the invention is described in detail below on the basis of the drawings. However, the embodiments below are not intended to limit the invention according to the claims, and not all combinations of characteristics described in the embodiments are necessarily required for solutions of the invention. The same reference numerals are used for the same elements throughout the description of the embodiments.

FIG. 1 illustrates a general configuration of an information system 100. The information system 100 includes a database device 110, an analysis system 120, and an innercorrelation frequent set storage device 130. The database device 110 stores a plurality of records, each containing an itemset consisting of one or more items.

One example of a record can be information on a history of transactions indicating a series of processes performed in an information processing device, such as the database device 110, in response to requests from the same user. In this case, an item can be a target of a transaction process, for example, a product, or alternatively, can be a property of a requester that requested a transaction or a property that indicates the content in a transaction process. The database device 110 stores each item in association with the identifier of a transaction containing that item.

Another example of a record can be a call log for each call recorded in a call center or survey information on answers to a questionnaire for each user collected on a Web site. In this case, an item can be a word that indicates a product name, a service name, a status of a product or a service, or a word that represents a positive or negative comment on a product or a service contained in the call log or the survey information. Such a word treated as an item has been previously extracted from a call log or survey information using a publicly known technique, such as matching. The database device 110 stores only a word treated as an item in association with the identifier of a record containing that word.

The analysis system 120 extracts a set of innercorrelation frequent itemsets from a plurality of records recorded in the database device 110 and registers it in the innercorrelation frequent set storage device 130. The innercorrelation frequent set is defined as follows: An itemset Y is innercorrelated frequent if "the itemset Y frequently occurs and, for any item y in the itemset Y, a subset Y−{y} of remaining items exclusive of y and the item y are correlated to each other."

The above definition of being innercorrelated frequent is described below using expressions. First, a set of all records is represented by $T=\{t_1, \ldots, t_n\}$, where $t_i$ denotes any record stored in the database device 110 and n is the total number of the records. A set of all itemsets is represented by $X=\{x_1, \ldots, x_m\}$, where xi denotes any item that occurs in at least one of the records and m denotes the number of the types of the items. For $Y \subset X$, where any subset Y is contained in a set X, a set of records that contain the set Y is represented by T(Y). That is, $T(Y):=\{t \in T | y \in t, \forall y \in Y\}$. Then, the itemset Y frequently occurs, which is also referred to simply as the itemset Y is frequent, if the following expression is satisfied:

$$|T(Y)| \geq S \text{ for } S \geq 1 \qquad \text{(Expression 1)}$$

where |T(Y)| denotes the size of the set T(Y), that is, the number of elements (the same applies to the following description), and S denotes a threshold for use in determination of frequent occurrence and is any integer equal to or more than one. A developer or user can set S at a relative value, such as 10% of the total number n of records.

The itemset Y is correlated frequent, that is, any item y in the itemset Y and a subset Y−{y} of remaining items exclusive of y are correlated to each other if the following expression is satisfied for the itemset Y:

$$f(|T(Y)|, |T(\{y\})|, |T(Y-\{y\})|) \geq \alpha \text{ for } y \in Y, \alpha > 1, \phi \neq Y \qquad \text{(Expression 2)}$$

where α denotes a threshold for use in determination of innercorrelation and is a numerical value more than one. To aim at extracting only a highly correlated itemset, a can be set at a large value, such as four or five. The function f is any function of |T(Y)|, |T({y})|, and |T(Y−{y})|. One example of the function f can be given by the following expression:

$$\frac{|T| \, || \, T(Y)|}{|T(Y-\{y\})| \, || \, T(\{y\})|} \qquad \text{(Expression 3)}$$

In Expression 2 (or Expression 3), if y is regarded as not any item y in the itemset Y but a specific item y, Expression 1 and Expression 2 (or Expression 3) indicate a condition for extracting a correlation rule of Y−{y}→Y disclosed in M. Boley et al., "Efficient Discovery of Interesting Patterns Based on Strong Closedness," Statistical Analysis and Data Mining, Volume 2, Issue 5&ash;6, Pages 346-360, December 2009. Accordingly, innercorrelation defined in the present invention can require that, for every item of all items in the itemset Y, a correlation rule of Y−{y}→Y be established.

The condition of Expression 2 (or Expression 3) requires that, for all items in the itemset Y, each item y occurs in cooperation with the occurrence of a subset of remaining items exclusive of that item y. Therefore, with the condition of Expression 2 (or Expression 3), itemsets consisting of a set of items that truly tend to co-occur can be listed. Thus, the use of both of the conditions of Expression 1 and Expression 2 (or Expression 3) enables only a meaningful frequent itemset to be extracted finally.

The value of a predetermined threshold S for use in determination of frequent occurrence and that of a predetermined threshold a for use in determination of innercorrelation can be specified in the analysis system 120 for each analysis by a user using an input device, such as a keyboard. Alternatively, the predetermined thresholds S and a can have been previously specified in the analysis system 120 by a developer as a fixed value that cannot be changed by a user. In either case, the values of the predetermined thresholds S and a are recorded in a configuration file and retained in the analysis system 120. The configuration file can record other information, such as the total number n of records and the total number m of items.

The innercorrelation frequent set storage device 130 records a set of innercorrelation frequent itemsets extracted by the analysis system 120 from a plurality of records recorded in the database device 110. In response to a request from a user, the innercorrelation frequent set storage device 130 outputs a set of innercorrelation frequent itemsets to an output device, such as a designated display or printer, or other information processing devices.

FIG. 2(a) illustrates an outline of a data structure of the database device 110. As illustrated in FIG. 2(a), for each record the database device 110 records a set of items contained in a record. In the table, $t_1$ or $t_2$ is an ID for uniquely identifying a record, and $x_1$ or $x_2$ is an ID for uniquely identifying an item. In the present embodiment, records and items are identified by IDs being serial positive integers and have an order in which they are arranged determined by the IDs. The order in which items are arranged is not limited to this one. It can be any order, for example, one determined by frequencies of the items. However, it is to be noted that no matter what order is used, an empty item (ϕ) first appears.

The table illustrated in FIG. 2(b), which has the same content as in the table illustrated in FIG. 2(a), records a set of records that contain an item for each item. This is used as a look-up table for use in obtaining a set of IDs of records that contain an item using the ID of that item as an index and is compiled by a preprocessor 300 described below on the basis of the original table illustrated in FIG. 2(a). The set of IDs of records is recorded in ascending order of the IDs of the records.

Figure 3:
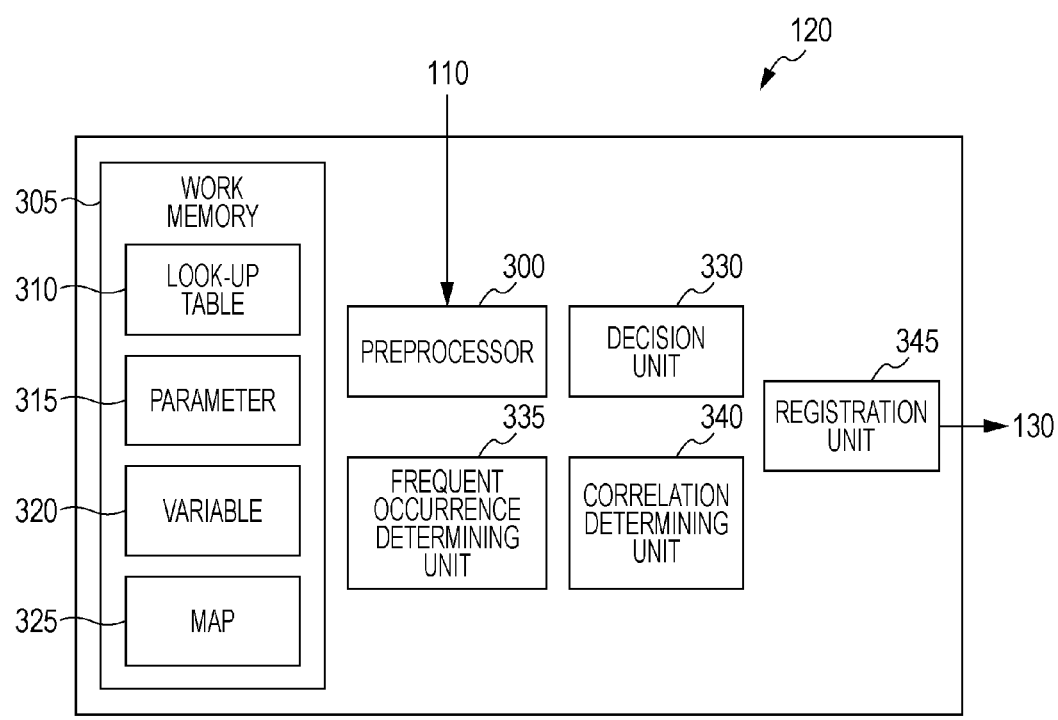
FIG. 3 illustrates a functional configuration of an analysis system 120.

FIG. 3 illustrates a functional configuration of the analysis system 120. The analysis system 120 includes the preprocessor 300, a work memory 305, a decision unit 330, a frequent occurrence determining unit 335, a correlation determining unit 340, and a registration unit 345. As previously stated, the preprocessor 300 makes access to the database device 110 and compiles a look-up table 310 in which a set of IDs of records that contain an item is recorded in ascending order of the IDs of the records for each item from a plurality of records stored in the database device 110 on the work memory 305.

The preprocessor 300 reads a predetermined threshold S for use in determination of frequent occurrence, a predetermined threshold a for use in determination of innercorrelation, a total number n of records from a configuration file retained in the analysis system 120 and loads these parameters 315 into the work memory 305.

The preprocessor 300 also prepares an array Y that holds a list of IDs of items forming an old itemset that is an immediately preceding investigation target and initializes it to an empty list. The preprocessor 300 also prepares an array U that holds a list of IDs of records that contain the old itemset and initializes it to a list in which IDs of all records are arranged in ascending order. Then the preprocessor 300 retains these variables 320 on the work memory 305. The array Y is used by the decision unit 330 described below to decide a new itemset that is to become a new investigation target. The array U is used by the frequent occurrence determining unit 335 described below in determination of frequent occurrence.

The preprocessor 300 further prepares a map 325 (corresponding to a table in the claims) in which the frequency of occurrence of an itemset determined as being frequent by the frequent occurrence determining unit 335 described below is stored on the work memory 305 and initializes it. The map 325 has a map structure for use in searching for the frequency of occurrence of an itemset determined as being frequent using a list of IDs of items forming that itemset as a key. One example of such a map structure can be java.util.HashMap in the case of Java™.

When there are one or more items after the last item in the order in an old itemset, the decision unit 330 adds one of the one or more items after the last item to the old itemset in descending order and sequentially decides new itemsets that are to become a new investigation target. The decision unit 330 passes information on the decided new itemset along with ID information for the one item added to the old itemset to the frequent occurrence determining unit 335.

As described above, the initial value of the old itemset is an empty item $\phi$ being the first item in the order. Accordingly, where a set of all items is $X=\{x_1, \ldots, x_m\}$ and an order in which the items are arranged is $\phi<x_1< \ldots <x_m$, an itemset $\{x_m\}$ consisting of the last item $x_m$ in the order is first decided as a new itemset. After that, items $x_i$ are decided as a new itemset in descending order of the IDs of the items, and the new itemset is subjected to an investigation process performed by, for example, the frequent occurrence determining unit 335 described below. It is to be noted that if the new itemset is output from the registration unit 345 described below to the innercorrelation frequent set storage device 130, the decision unit 330 updates the old itemset to the current new itemset and newly decides a new itemset on the basis of the old itemset after the updating previous to the old itemset before the updating. Information on the old itemset before the updating is retained on the work memory 305 to allow it to be referred to later.

An order of deciding an itemset as a new itemset that is to become an investigation target by the decision unit 330 is described below using an itemset tree. First, the itemset tree is described. The set of all items is $X=\{x_1, \ldots, x_m\}$, and the order in which the items are arranged is $\phi<x_1<\ldots<x_m$ (where $\phi$ is an empty item). The itemset tree is defined as a tree that has nodes each having the ID of an empty item $\phi$ or an item xi as a label and that satisfies the following (1) and (2):
(1) A root node has the ID of an empty item $\phi$ as a label.
(2) If the label of a node E is L, the node E has a node E' corresponding to a label L' that satisfies L<L' as a child node. The number of the child nodes are the same as the number of the labels L', which satisfies L<L', and the child nodes are sorted in ascending order.

Figure 4:
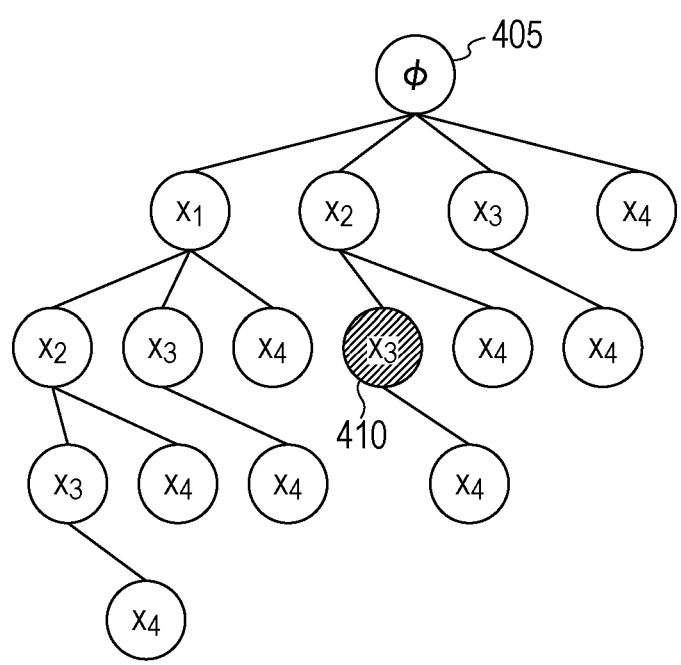
FIG. 4 illustrates an example itemset tree.

FIG. 4 illustrates a concrete example of an itemset tree. In the example illustrated in FIG. 4, the set of all items is $X=\{x_1,$ $x_2, x_3, x_4\}$ and the order in which the items are arranged is $\phi<x_1<x_2<x_3<x_4$, where ($\phi$ in the order denotes an empty item. In FIG. 4, in terms of a root node 405, the label of the root node 405 is $\phi$. Items after $\phi$ are four items of $x_1, x_2, x_3$, and $x_4$. Accordingly, the root node 405 has the four child nodes having the IDs of the items $x_1, x_2, x_3$, and $x_4$ as their respective labels. The child nodes are sorted such that the IDs of their labels are arranged in ascending order. In terms of a node 410, the node 410 has a label of $x_3$. Only the item $x_4$ is an item after the item $x_3$ in the order. Accordingly, the node 410 has only the child node having $x_4$ as its label. Similarly, the above tree definitions (1) and (2) are satisfied in the other nodes.

For an itemset tree defined in this manner, each node indicates an itemset consisting of items identified by the labels of nodes passed from the root node to that node, and this itemset and an itemset obtainable from the set of all items $X=\{x_1, \ldots, x_m\}$ are in a one-to-one relationship. In the case of the node 410 illustrated in FIG. 4, for example, because the node 410 is a node reached by a path from $\phi$ to $x_2$ to $x_3$, it indicates the itemset $\{x_2, x_3\}$.

The order of deciding a new itemset as a current investigation target by the decision unit 330 is the same as the sequence of scanning an itemset tree defined as described above in a depth-first manner and in descending order. FIG. 5(*a*) illustrates a scanning sequence occurring when the tree illustrated in FIG. 4 as an example is scanned in a depth-first manner and in descending order. The numerals at the sides of the nodes indicate the scanning order. Note that a subset of remaining items in which any one item is removed from an itemset indicated by the current node in the course of the scanning is the same as an itemset indicated by a node scanned before the current node.

The frequent occurrence determining unit 335 calculates the frequency g of occurrence of a new itemset and, on condition that that value is equal to or larger than the predetermined threshold S, registers the frequency g of occurrence of the new itemset in the map 325. Here, the frequency g of occurrence of the new itemset can be calculated employing the look-up table 310. That is, for each item, a list of IDs of records that contain the item is obtained from the look-up table 310 by using the ID of the item contained in the new itemset as a key. The number of IDs of records commonly contained in all of the obtained lists of IDs of records is counted, thus calculating the frequency g of occurrence of the new itemset.

Alternatively, the frequent occurrence determining unit 335 can calculate the frequency g of occurrence of a new itemset using the look-up table 310 and the array U retained on the work memory 305 as described below. As described above, the array U holds a list of IDs of records that contain an old itemset. A new itemset is an itemset in which one item is added to the old itemset. Accordingly, the frequency g of occurrence of the new itemset is the same as the number of IDs of records commonly contained in the list of IDs that contain the one added item and the array U.

The frequent occurrence determining unit 335 obtains the list of IDs that contain the one added item from the look-up table 310 using, as a key, the ID of the one added item received from the decision unit 330 together with information on the new itemset. The frequent occurrence determining unit 335 compiles a list of IDs of records commonly contained in the obtained list and the array U and calculates the frequency g of occurrence of the new itemset from the size of the compiled list. The compiled list is held in an array U' and retained on the work memory 305 so as to make the array U hold the list of IDs of records that contain the old itemset by updating of the array U to the array U' in conjunction with updating of the old itemset to the new itemset.

In response to registration of the frequency g of occurrence of the new itemset in the map 325, the correlation determining unit 340 determines whether there is a correlation between each item in the new itemset and a subset of remaining items exclusive of that item by referring to values in the map 325. This determination of correlation can be performed using a function whose variables are the frequency of occurrence of the new itemset, that of one item in the new itemset, and that of a subset of remaining items in which the one item is removed from the new itemset, as described for Expression 2 above.

Here, the frequency g of occurrence of the new itemset has already been calculated by the frequent occurrence determining unit 335. The frequency of occurrence of each item in the new itemset can be calculated as the size of a list of IDs of records obtained from the look-up table 310 using the ID of the item as a key. The frequency of occurrence of a subset of remaining items in which one item is removed from the new itemset is obtainable from the map 325. The reason is described below.

The sequence of deciding a new itemset as a current investigation target by the decision unit 330 is the same as the sequence of scanning an itemset tree defined by the above definitions (1) and (2) in a depth-first manner and in descending order. For such a scan of an itemset tree in a depth-first manner and in descending order, a subset of remaining items in which any one item is removed from an itemset indicated by a current node in the course of scanning is the same as an itemset indicated by a node scanned before the current node; thus the frequency of occurrence of that subset has already been calculated. If a certain itemset is a frequent itemset, a subset thereof is always a frequent itemset. Consequently, the frequency of occurrence of any subset of remaining items in which one item is removed from a new itemset in the course of being processed and being determined as being frequent has been recorded in the map 325.

Accordingly, the correlation determining unit 340 can obtain all frequencies of occurrence necessary to determine correlation from data and the map 325 on the work memory 305. More specifically, the correlation determining unit 340 determines using a function provided in Expression 3, whether there is a correlation between each item in the new itemset and a subset of remaining items exclusive of that item.

In this manner, for the present invention, the frequency of occurrence of a frequent itemset is recorded, and it is reused later in determination of correlation of an itemset that later becomes an investigation target. Accordingly, with the present invention, redundant counting of the frequency of occurrence of the same itemset can be avoided, and a set of meaningful frequent itemsets can be efficiently extracted.

Preferably, if items forming a new itemset that contains the second item in the order are discontinuous, the correlation determining unit 340 can delete, from the map 325, the frequency of occurrence of an itemset in which the earliest item in the order of the discontinuous items is removed from the new itemset and the frequency of occurrence of an itemset in which the second item in the order is removed from the new itemset. This aims to save memory by deleting the frequencies of occurrence of such itemsets, which will not be used in subsequent determination of correlation, from the map 325.

An itemset whose frequency of occurrence can be deleted from the map 325 is described below using the itemset tree illustrated in FIG. 5(a) as a concrete example. As previously stated, for the itemset tree illustrated in FIG. 5(a), the set of all items is $X=\{x_1, x_2, x_3, x_4\}$ and the order in which the items are arranged is $\phi < x_1 < x_2 < x_3 < x_4$ (where $\phi$ is an empty item). The numerals at the sides of the nodes indicate the scanning sequence. Here, a case where a current scan node is a node 505 which is the 11th node in the scanning sequence is discussed. Because the node 505 indicates the itemset $\{x_1, x_3, x_4\}$, a current investigation target new itemset $Y'=\{x_1, x_3, x_4\}$.

The new itemset Y' contains the second item $x_1$ in the order (the first item in the order is $\phi$), and the items $x_1$ and $x_3$ are discontinuous in the order. Accordingly, a subset $\{x_3, x_4\}$, in which the earliest item $x_1$ in the order of the discontinuous items is removed from the new itemset Y', can be deleted from the map 325 because it will not be used in subsequent determination of correlation. This is confirmed below with reference to the tree illustrated in FIG. 5(a).

After the itemset $\{x_1, x_3, x_4\}$ indicated by the node 505 becomes a new itemset, the itemsets $\{x_1, x_2\}$, $\{x_1, x_2, x_4\}$, $\{x_1, x_2, x_3\}$, $\{x_1, x_2, x_3, x_4\}$ sequentially become a new itemset. However, the subset $\{x_3, x_4\}$ does not occur in the itemsets $\{x_1, x_2, x_4\}$ and $\{x_1, x_2, x_3\}$. Although the subset $\{x_3, x_4\}$ occurs in the itemset $\{x_1, x_2, x_3, x_4\}$, because the size of the subset $\{x_3, x_4\}$ is two, the subset $\{x_3, x_4\}$ will not be used in determination of correlation of the subset $\{x_1, x_2, x_3, x_4\}$, whose size is four. Accordingly, after the determination of correlation of the itemset indicated by the node 505 is completed, the frequency of occurrence of the subset $\{x_3, x_4\}$ can be deleted from the map 325.

In the above concrete example, because an itemset in which the earliest item in the order of discontinuous items is deleted removed from a new itemset and an itemset in which the second item in the order is removed from the new itemset are the same, there is a single itemset whose frequency of occurrence can be deleted. In contrast, if these itemsets are not the same, there are two types of itemsets whose frequencies of occurrence can be deleted from the map 325.

The registration unit 345 outputs a new itemset as a meaningful frequent itemset to the innercorrelation frequent set storage device 130 on condition that determination of correlation made by the correlation determining unit 340 is positive for each of all the items in the new itemset.

As described above, for the present invention, determination of frequent occurrence and determination of innercorrelation are performed at a time for each itemset. If frequent itemsets were first listed and determination of innercorrelation were then performed separately, because the whole set of frequent itemsets, which is typically too large to be placed on the memory, needs to be retained in a temporary file and read therefrom, large overhead can be caused. With the present invention, such overhead can be reduced.

Figure 6:
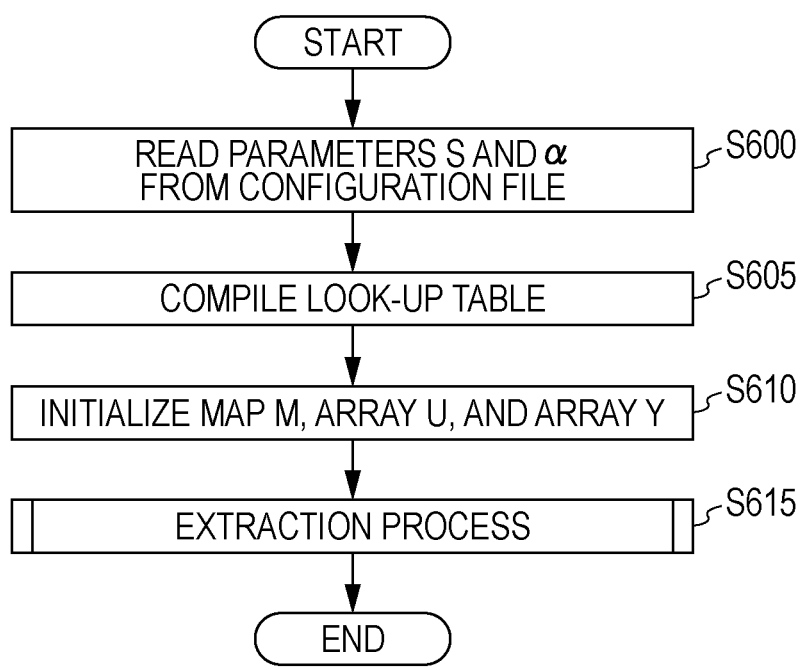
FIG. 6 illustrates an example flow of a general process performed by the analysis system 120.

Next, flows of processes performed by the analysis system 120 according to the embodiment of the present invention are described with reference to FIGS. 6 and 7. FIG. 6 illustrates an example flow of a process performed by the analysis system 120. FIG. 7 illustrates an example flow of extraction process at step 615 in FIG. 6. In the description below, the total number of recodes is n, and the number of types of items contained in a record is m. An item has an ID that is a positive serial integer stating at one (the ID of an empty item $\phi$ is zero), and the items have an order in which they are arranged determined by their IDs.

The process illustrated in FIG. 6 starts at step 600, where the preprocessor 300 of the analysis system 120 reads the value of a predetermined threshold S for use in determination of frequent occurrence, the value of a predetermined threshold a for use in determination of innercorrelation, and the total number n of records from a configuration file retained in the analysis system 120 and retains these parameters 315 on the work memory 305.

Subsequently, the decision unit 330 makes access to the database device 110 and reads a list of IDs of items contained in a record for each record. The decision unit 330 compiles the look-up table 310 for returning a list in which a set of IDs of records that contain that item is recorded in ascending order on the work memory 305 using the ID of an item as a key on the basis of the read list (step 605). In the following description, the list returned from the look-up table 310 using i being the ID of any item is denoted as T[i].

Subsequently, the preprocessor 300 prepares, on the work memory 305, the map 325 in which the frequencies of occurrence of itemsets determined as being frequent are registered, the array Y in which a list of IDs of items forming an old itemset being an itemset that is an immediately preceding investigation target is stored, and the array U in which a list of IDs of records that contain the old itemset is stored and initializes them (step 610). As previously stated, the array Y is initialized to an empty list, and the array U is initialized to a list of IDs of all records.

Subsequently, the analysis system 120 performs an extraction process of extracting an innercorrelation frequent itemset from the database device 110 using data on the work memory 305 (step 615). Then, the process is completed. The details of the extraction process are described below with reference to FIG. 7. The extraction process at step 615 is recursively performed by the decision unit 330, frequent occurrence determining unit 335, correlation determining unit 340, and registration unit 345 of the analysis system 120.

FIG. 7 illustrates an example flow of the extraction process of extracting an innercorrelation frequent itemset performed by the decision unit 330, frequent occurrence determining unit 335, correlation determining unit 340, and registration unit 345. As described above, the extraction process illustrated in FIG. 7 is recursively called and performed. The parameters 315, including the predetermined threshold S, predetermined threshold a, and total number T of records, the look-up table 310, and the map 325 are referred to commonly in the extraction processes.

The extraction process starts at step 700, where the decision unit 330 prepares a variable x indicating one item to be added to an old itemset on the work memory 305 and sets the variable x at the maximum ID among all item IDs, that is, m. The decision unit 330 also prepares a variable j indicating the maximum item ID contained in the array Y on the work memory 305 and sets the variable j at zero if the current array Y is empty and at the maximum item ID contained in the current array Y otherwise.

Subsequently, the decision unit 330 determines whether the value of the variable x is larger than that of the variable j (step 705). If x>j (YES at step 705), that is, if there exists an item that has not yet been investigated and that is positioned after the last item in the order in the old itemset, the decision unit 330 sets one in which the item ID indicated by the value of the variable x is added to the list of IDs of items of the old itemset stored in the array Y at the array Y' (step 710). Here, the array Y' is an array in which a list of IDs of items forming a new itemset that is to become a new investigation target is stored. The decision unit 330 prepares the array Y' on the work memory 305 at the initial performance of step 705 in each extraction process. In contrast, at step 705, if the value of the variable x is not larger than that of the variable j (NO at step 705), that is, if there is no item that has not yet been investigated and that is positioned after the last item in the order in the old itemset, the process is completed.

The process proceeds from step 710 to step 715, at which, in response to the decision on the new itemset, the frequent occurrence determining unit 335 obtains, from the look-up table 310, the list T[x] in which a set of IDs of records that contain the added item is recorded using the ID of the item indicated by the value of the variable x and added to the old itemset as a key. Then the frequent occurrence determining unit 335 sets a list of IDs commonly contained in the obtained list T[x] and the array U in which the list of IDs of records that contain the old itemset is stored at the array U'. The frequent occurrence determining unit 335 also sets the size of the array U' at a variable g indicating the frequency of occurrence of the new itemset. Here, the array U' is an array in which a list of IDs of records that contain the new itemset is stored. The frequent occurrence determining unit 335 prepares the array U' and the variable g on the work memory 305 at the initial performance of step 715 in each extraction process.

Subsequently, the frequent occurrence determining unit 335 reads the predetermined threshold S for use in determination of frequent occurrence from the work memory 305 and determines whether the variable g indicating the frequency of occurrence of the new itemset is equal to or more than the predetermined threshold S (step 720). If the variable g is equal to or more than the predetermined threshold S (YES at step 720), the frequent occurrence determining unit 335 registers a combination of the array Y' and the variable g in the map 325 and retains the frequency of occurrence of the new itemset determined as being frequent on the work memory 305 (step 725).

Subsequently, in response to the registration of the frequency of occurrence of the new itemset in the map 325, the correlation determining unit 340 prepares, on the work memory 305, a Boolean variable b indicating determination of innercorrelation and a variable k for identifying one item to be removed from the new itemset and initializes the variables b and k to the value true and the size of the array Y, respectively (step 730).

Subsequently, the correlation determining unit 340 determines whether the value of the variable k is larger than zero (step 735). If the variable k is larger than zero (YES at step 735), that is, if determination of correlation for all items in the itemset has been uncompleted, the correlation determining unit 340 removes the item ID indicated by the value of the variable k from the list of IDs of items of the new itemset stored in the array Y' to acquire a list of IDs of a subset. Then, the correlation determining unit 340 obtains the frequency of occurrence of the subset from the map 325 using the list of IDs of the subset as a key and sets this frequency of occurrence at a variable h prepared on the work memory 305 (step 740).

Subsequently, the correlation determining unit 340 determines whether there is a correlation between the item identified by the value of the variable k and the subset of remaining items in which that item is removed from the new itemset using the function f represented by Expression 3 by the following expression, including the variable h (step 745).

$$gn < \alpha |T[k]| h \qquad \text{(Expression 4)}$$

where g denotes the frequency of occurrence of the new itemset, n the total number of records, $\alpha$ the value of the predetermined threshold for use in determination of innercorrelation, and |T[k]| the size of the list of IDs of records that contain the item identified by the variable k, that is, the frequency of occurrence of the item identified by the value of the variable k.

If Expression 4 is not satisfied at step 745, that is, if it is determined that there is a correlation (NO at step 745), the correlation determining unit 340 decrements the value of the variable k by one (step 750), and the flow returns to step 735. In contrast, if Expression 4 is satisfied, that is, if it is determined that there is no correlation (YES at step 745), the correlation determining unit 340 sets the value false to the variable b (step 755).

If at step 735 the variable k is not larger than zero (NO at step 735), that is, if determination of correlation for all items in the new itemset is completed, or if at step 755 the variable b is set at the value false, the flow proceeds to step 760, at which the registration unit 345 determines whether the value of the variable b is true. If the value of the variable b is true (YES at step 760), that is, if it is determined that there is a correlation between each of all items in the new itemset and the subset of the remaining items and that the new itemset is an innercorrelation frequent itemset, the registration unit 345 outputs the value of the array Y', that is, the list of IDs of items forming the new itemset and the value of the variable g, that is, the frequency of occurrence of the new itemset to the innercorrelation frequent set storage device 130 and registers the new itemset as a meaningful frequent itemset (step 765).

In contrast, if the value of the variable b is not true (NO at step 760), that is, if it is determined that the new itemset is not an innercorrelation frequent itemset, or from step 765, the flow proceeds to step 770. The registration unit 345 newly prepares an array Y in which a list of IDs of items forming an old itemset that is an immediately preceding investigation target is stored and an array U in which a list of IDs of records that contain the old itemset is stored on the work memory 305 and sets the array Y at the array Y' and the array U at the array U'. After that, the extraction process is performed again (step 770).

When the extraction process called at step 770 is completed or if at step 720 the variable g is smaller than the predetermined threshold S (NO at step 720), that is, if the new itemset is not frequent, the flow proceeds to step 775, at which the value of the variable x is decremented by one. After that, the flow returns to step 705. A series of processing from step 705 to step 775 is repeated until it is determined at step 705 that x is equal to or less than j, that is, that there is no item that has not yet been investigated and that is positioned after the last item in the order in the old itemset.

FIG. 8 illustrates example pseudocode of recursive function Mine for performing the process of extracting an innercorrelation frequent itemset described with reference to FIG. 7. In FIG. 8, X denotes a set of all items, T a set of all records, a a predetermined threshold for use in determination of innercorrelation, S a predetermined threshold for use in determination of frequent occurrence, O a set (output) of innercorrelation frequent itemsets, Y an old itemset being an immediately preceding investigation target (its initial value is empty φ), T(Y) a set of records that contain the old itemset (its initial value is the set of all records), and M a map in which the frequencies of occurrence of frequent itemsets are registered. The itemset tree described in the code is a tree that meets the definitions (1) and (2) for an itemset tree described above.

Figure 9:
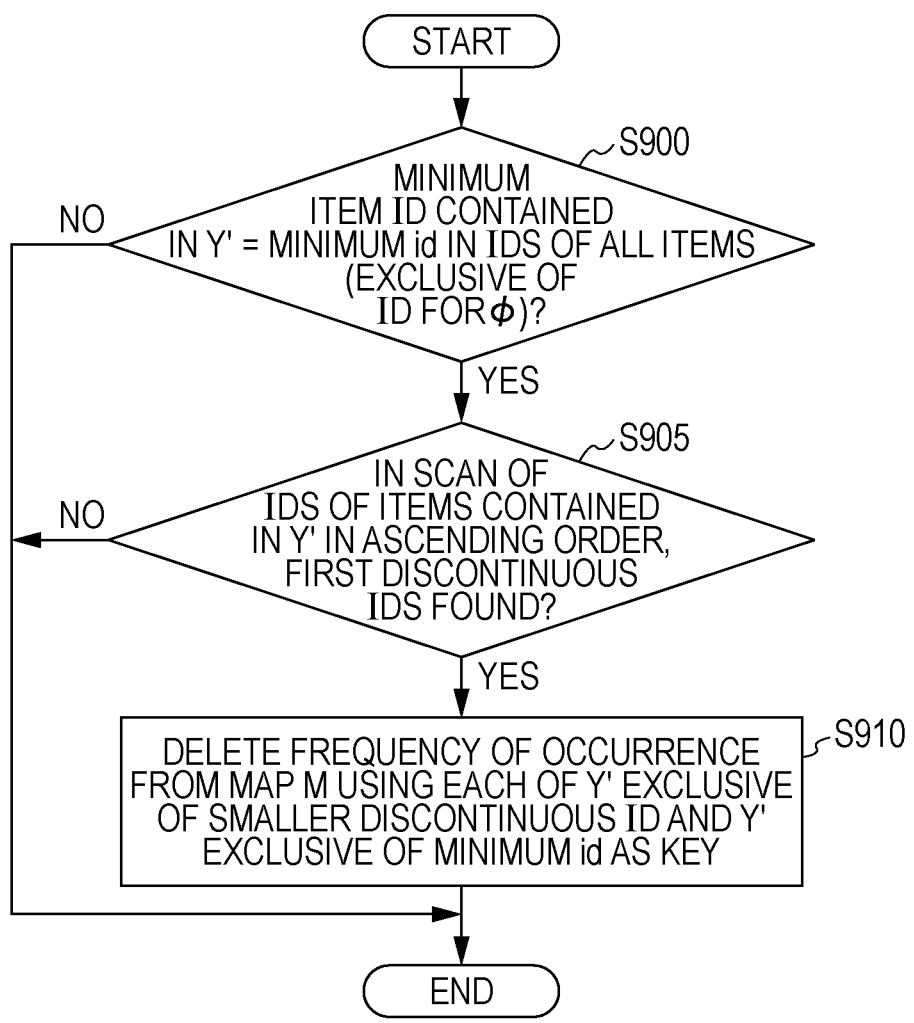
FIG. 9 illustrates an example flow of a process of deleting an unnecessary key in a map 325.

FIG. 9 illustrates an example flow of a deletion process of deleting an unnecessary key in the map 325. The deletion process is optional, and it is performed by the correlation determining unit 340 after the determination at step 735 is NO or after step 755 and before step 760. The process starts at step 900, where the correlation determining unit 340 determines whether the minimum item ID among all item IDs, exclusive of the ID of the empty φ (=0), is contained in the array Y' in which the list of IDs of items forming the new itemset is stored. If the minimum item ID (exclusive of zero) among all item IDs is not contained in the array Y' (NO at step 900), the process is completed.

In contrast, if the minimum item ID (exclusive of zero) among all item IDs is contained in the array Y' (YES at step 900), then the correlation determining unit 340 scans the list of item IDs contained in the array Y' in ascending order and determines whether discontinuous item IDs have been found (step 905). The scan of the list of item IDs can be completed at the time when discontinuous item IDs are found. If no discontinuous item IDs have been found (NO at step 905), the process is completed.

In contrast, if discontinuous item IDs have been found (YES at step 905), the correlation determining unit 340 deletes the frequency of occurrence from the map 325 using each of the array Y' exclusive of the smaller discontinuous item ID and the array Y' exclusive of the minimum item ID in the array Y' as a key (step 910). Then the process is completed.

Figure 10:
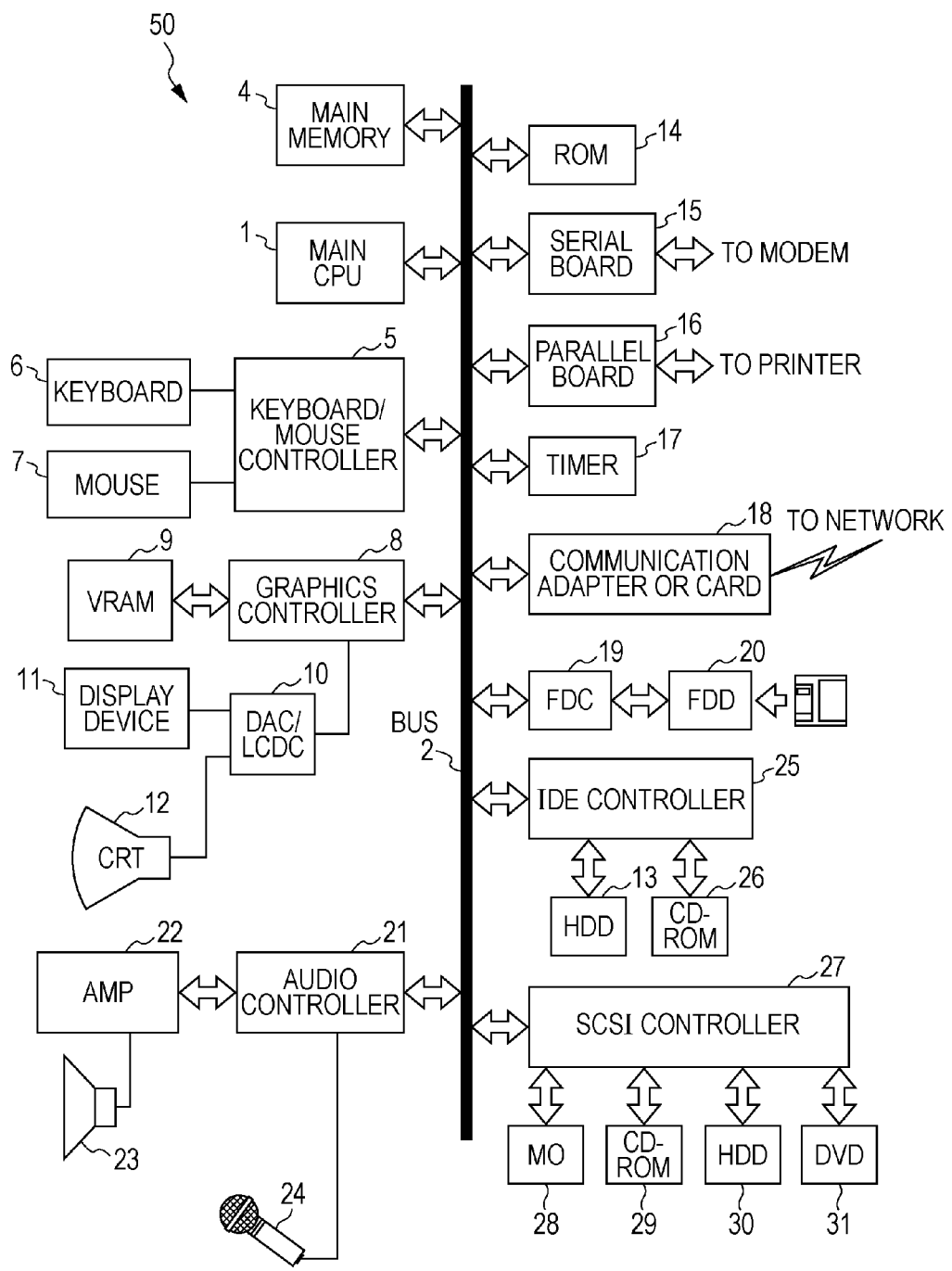
FIG. 10 illustrates an example of a hardware configuration of an information processing device that functions as the analysis system 120.

FIG. 10 illustrates an example hardware configuration of an information processing device that functions as the analysis system 120. An information processing device 50 includes a main central processing unit (CPU) 1 and a main memory 4. The CPU 1 and main memory (4) are connected to a bus 2. Hard disk devices 13 and 30 and removable storages (external storage systems whose recording media are exchangeable), such as compact-disk read-only memory (CD-ROM) devices 26 and 29, a flexible disk device 20, a magneto-optic (MO) device 28, and a digital versatile disc (DVD) device 31, are connected to the bus 2 through a controller, such as a flexible disk controller 129, an IDE controller 25, and a small computer systems interface (SCSI) controller 27.

A storage medium, such as a flexible disk, a MO disk, a CD-ROM, or a DVD-ROM, is inserted into a removable storage. Code of a program for providing an instruction to the CPU 1 or other units in cooperation with an operating system and for use in carrying out the present invention can be recorded on these storage media, the hard disk devices 13 and 30, and a ROM 14. That is, an extraction program to be installed in the information processing device 50 to cause the information processing device 50 to function as the analysis system 120 can be recorded on various kinds of storage devices described above.

The above-described extraction program includes a preprocessing module, a decision module, a frequent occurrence determination module, a correlation determination module, and a registration module. These modules act on the CPU 1 or other units to make the information processing device 50 function as the preprocessor 300, decision unit 330, frequent occurrence determining unit 335, correlation determining unit 340, and registration unit 345. The computer program can be compressed or divided into a plurality of sections and recorded on a plurality of media.

The information processing device 50 receives an input from an input device, such as a keyboard 6 or a mouse 7, through a keyboard/mouse controller 5. The information processing device 50 receives an input from a microphone 24 through an audio controller 21 and outputs a sound through a speaker 23. The information processing device 50 is connected to a display device 11 for showing visual data to a user through a DAC/LCDC 10. The information processing device 50 can be connected to a network through a network adapter 18 (Ethernet (registered mark) card or token ring card) or other elements and can conduct communications with other computers or the like.

From the foregoing description, it will be readily appreciated that the information processing device 50 according to the present embodiment can be achieved by an information processing device, such as a normal personal computer, work station, or main frame, or a combination thereof. The above components are described for purpose of illustration, and not all the components can be necessary components for the present invention.

The present invention has been described above using the embodiment, but the technical scope of the present invention is not limited to the scope of the description of the above-described embodiment. For the above-described embodiment, the decision unit 330 has been described as deciding a new itemset in the same sequence as that of scanning an itemset tree that meets the above-described definitions (1) and (2) in a depth-first manner and in descending order. Alternatively, however, the decision unit 330 can decide a new itemset in the same sequence as that of scanning an itemset tree that meets the above-described definitions (1) and (2) in a breath-first manner and in descending order.

FIG. 5(*b*) illustrates a scanning sequence occurring when the tree illustrated in FIG. 4 as an example is scanned in a breadth-first manner and in descending order. The numerals at the sides of the nodes indicate the scanning sequence. Also in this case, note that a subset of remaining items in which any one item is removed from an itemset indicated by the current node in the course of the scanning is the same as an itemset indicated by a node scanned before the current node. Therefore, the frequency of occurrence of the subset of the remaining items in which one item is removed from the new itemset is obtainable from the map 325. Accordingly, also with the above-described sequence, redundant counting of the frequency of occurrence of the same itemset can be avoided, and a set of meaningful frequent itemsets can be efficiently extracted.

In the case of decision of a new itemset in the same sequence as that of scanning in a breadth-first manner and in descending order, a method for calculating the frequency of occurrence of a new itemset by the frequent occurrence determining unit 335 is limited to a method for obtaining a list of IDs of records that contain an item for each item from the look-up table 310 using the ID of an item contained in the new itemset as a key and counting the number of IDs of records commonly contained in all the obtained lists of IDs of records. However, for the map 325, a memory region can be saved in a way described below. That is, for a scanning sequence for an itemset tree, if the depth of a current scan node increases by one, because the frequency of occurrence calculated for the second node in the depth (exclusive of a one-depth node) before the current scan node is unnecessary, its frequency of occurrence can be deleted from the map 325.

As described above, it will be apparent to those skilled in the art that various modifications or improvements can be added to the above-described embodiment. Accordingly, embodiments to which such modifications or improvements are added are contained in the technical scope of the present invention.

Note that "ahead of" and "prior to" are not particularly explicitly stated in an order of executing each process, such as an operation, procedure, step, and stage, in a device, system, program, and method illustrated in the claims, specification, and drawings and that the processes can be performed in any sequence unless an output of a previous process is employed in a subsequent process. Even if an output of a previous process is employed in a subsequent process, also note that another process can be inserted between the previous process and the subsequent process or that, even when another process is described as being performed there between, the previous process can be changed so as to be performed immediately before the subsequent process. Even if "first," "then," "subsequently," and other words are used for the sake of convenience in an operational flow in the claims, specification, and drawings, the processes can not be performed in this order.

What is claimed is:

1. A method for extracting a meaningful frequent itemset from a database in which a plurality of records each containing an itemset consisting of one or more items is stored by calculation processing of a computer, the plurality of items in the database having an order in which the items are arranged, the method comprising the steps of:

(a) if there exist one or more items after a last item in an order of items in an old itemset, wherein the old itemset is an immediately preceding investigation target, deciding, by the computer, a new itemset that is a new investigation target by adding one of the one or more items after the last item to the old itemset in descending order, wherein the old itemset has an initial value of an empty item φ being the first item in the order;

(b) registering, by the computer, a frequency of occurrence of the new itemset in a table prepared on a memory of the computer on the condition that the frequency of occurrence of the new itemset is equal to or more than a predetermined threshold;

(c) in response to the registration in the table, determining, by the computer, using a value in the table, whether there is a correlation between each item in the new itemset and a subset of remaining items and in which that item is removed from the new itemset, wherein the correlation is determined if each item in the new itemset occurs in cooperation with the occurrence of the remaining items exclusive of that item, and wherein the determination of correlation is made by determination of whether an expression $|T| \times T(Y)| \geq \alpha \times |T(Y-\{y\})| \times |T(\{y\})|$ is satisfied, where $|T|$ denotes a total number of records, $|T(Y)|$ denotes a frequency of occurrence of a new itemset Y, $|T(\{y\})|$ denotes a frequency of occurrence of any item y in the new itemset Y, $|T(Y-\{y\})|$ denotes a frequency of occurrence of a subset of remaining items in which that item y is removed from the new itemset Y, and α denotes a predetermined threshold larger than one;

(d) registering, by the computer, the new itemset in a set of the meaningful frequent itemsets on the condition that the determination is positive for each of all the items in the new itemset; and (e) in response to the registration in the set of the meaningful frequent itemsets, by the computer, setting the new itemset to the old itemset and repeating the step (a) before deciding a new itemset on the basis of the original old itemset.

2. The method according to claim 1, further comprising the step of:

if items forming the new itemset containing a second item in the order are discontinuous, after the step (c), deleting, by the computer, from the table, a frequency of occurrence of an itemset in which the earliest item in the order of the discontinuous items is removed from the new itemset and a frequency of occurrence of an itemset in which the second item in the order is removed from the new itemset.

3. The method according to claim 2, wherein the table has a map structure for use in searching for a frequency of occurrence of an itemset using a list of an identification (ID) of each item forming the itemset as a key.

4. The method according to claim 3, wherein the order in which the items are arranged is an order in which IDs assigned to the items, the IDs being positive serial integers starting at one, are arranged.

5. A computer readable non-transitory article of manufacture tangibly embodying computer readable instructions which, when executed, cause a computer to carry out the steps of a method for extracting a meaningful frequent itemset from a database in which a plurality of records each containing an itemset consisting of one or more items is stored by processing of a computer, the plurality of items in the database having an order in which the items are arranged, the program product causing the computer to execute the steps of:
(a) if there exist one or more items after a last item in an order of items in an old itemset, wherein the old itemset is an immediately preceding investigation target, deciding a new itemset that is a new investigation target by adding one of the one or more items after the last item to the old itemset in descending order, wherein the old itemset has an initial value of an empty item ϕ being the first item in the order;
(b) registering a frequency of occurrence of the new itemset in a table on condition that the frequency of occurrence of the new itemset is equal to or more than a predetermined threshold;
(c) in response to the registration in the table, determining, using a value in the table, whether there is a correlation between each item in the new itemset and a subset of remaining items and in which that item is removed from the new itemset, wherein the correlation is determined if each item in the new itemset occurs in cooperation with the occurrence of the remaining items exclusive of that item, and wherein the determination of correlation is made by determination of whether an expression $|T|·|T(Y)| \geq \alpha \times |T(Y-\{y\})| \times |T(\{y\})|$ is satisfied, where $|T|$ denotes a total number of records, $|T(Y)|$ denotes a frequency of occurrence of a new itemset Y, $|T(\{y\})|$ denotes a frequency of occurrence of any item y in the new itemset Y, $|T(Y-\{y\})|$ denotes a frequency of occurrence of a subset of remaining items in which that item y is removed from the new itemset Y, and α denotes a predetermined threshold larger than one;
(d) registering the new itemset in a set of the meaningful frequent itemsets on condition that the determination is positive for each of all the items in the new itemset; and
(e) in response to the registration in the set of the meaningful frequent itemsets, setting the new itemset to the old itemset and repeating the step (a) before deciding a new itemset on the basis of the original old itemset.

6. The computer readable storage medium according to claim 5, further causing the computer to execute the step of:
if items forming the new itemset containing a second item in the order are discontinuous, after the step (c), deleting, from the table, a frequency of occurrence of an itemset in which the earliest item in the order of the discontinuous items is removed from the new itemset and a frequency of occurrence of an itemset in which the second item in the order is removed from the new itemset.

7. The computer readable storage medium according to claim 6, wherein the table has a map structure for use in searching for a frequency of occurrence of an itemset using a list of an ID of each item forming the itemset as a key.

8. The computer readable storage medium according to claim 6, wherein the order in which the items are arranged is an order in which IDs assigned to the items, the IDs being positive serial integers starting at one, are arranged.

9. A system for extracting a meaningful frequent itemset from a database in which a plurality of records each containing an itemset consisting of one or more items is stored, the plurality of items in the database having an order in which the items are arranged, the system comprising:
a memory;
a decision unit that, if there exist one or more items after a last item in an order of items in an old itemset, wherein the old itemset is an immediately preceding investigation target, decides a new itemset that is a new investigation target itemset by adding one of the one or more items after the last item to the old itemset in descending order, wherein the old itemset has an initial value of an empty item ϕ being the first item in the order;
a frequent occurrence determining unit that determines whether a frequency of occurrence of the new itemset is equal to or more than a predetermined threshold and, on condition that it is equal to or more than the predetermined frequency of occurrence, registers the frequency of occurrence of the new itemset in a table prepared on the memory;
a correlation determining unit that, in response to the registration in the table, determines, using a value in the table, whether there is a correlation between each item in the new itemset and a subset of remaining items and in which that item is removed from the new itemset wherein the correlation is determined if each item in the new itemset occurs in cooperation with the occurrence of the remaining items exclusive of that item, and wherein the correlation determining unit makes a determination of whether an expression $|T| \times |T(Y)| \geq \alpha \times |T(Y-\{y\})| \times |T(\{y\})|$ is satisfied, where $|T|$ denotes a total number of records, $|T(Y)|$ denotes a frequency of occurrence of a new itemset Y, $|T(\{y\})|$ denotes a frequency of occurrence of any item y in the new itemset Y, $|T(Y-\{y\})|$ denotes a frequency of occurrence of a subset of remaining items in which that item y is removed from the new itemset Y, and α denotes a predetermined threshold larger than one; and
a registration unit that registers the new itemset in a set of the meaningful frequent itemsets on condition that the determination is positive for each of all the items in the new itemset,
wherein, in response to the registration in the set of the meaningful frequent itemsets, the decision unit sets the new itemset to the old itemset and decides a new itemset earlier for that old itemset.

10. The system according to claim 9, wherein, if items forming the new itemset containing a second item in the order are discontinuous, the correlation determining unit deletes, from the table, a frequency of occurrence of an itemset in which the earliest item in the order of the discontinuous items is removed from the new itemset and a frequency of occurrence of an itemset in which the second item in the order is removed from the new itemset.

11. The system according to claim 9, wherein the table has a map structure for use in searching for a frequency of occurrence of an itemset using a list of an ID of each item forming the itemset as a key.

12. The system according to claim 11, wherein the order in which the items are arranged is an order in which IDs assigned to the items, the IDs being positive serial integers starting at one, are arranged.

* * * * *